United States Patent [19]
Kirchhoff et al.

[11] Patent Number: 4,791,182
[45] Date of Patent: Dec. 13, 1988

[54] COPPER SALTS AS CATALYSTS FOR MONOMERS HAVING AT LEAST ONE CYCLOBUTARENE GROUP

[75] Inventors: Robert A. Kirchhoff; Jo Ann Gilpin; Cynthia Baker, all of Midland, Mich.; Michael O. Myers, Baton Rouge, La.

[73] Assignee: Dow Chemical Company, Midland, Mich.

[21] Appl. No.: 95,370

[22] Filed: Sep. 8, 1987

[51] Int. Cl.⁴ .................................................. C08F 4/06
[52] U.S. Cl. ...................................... 526/221; 526/284; 528/396; 522/66
[58] Field of Search ........................ 526/221, 284, 396

[56] References Cited

U.S. PATENT DOCUMENTS

| | | | |
|---|---|---|---|
| 2,380,473 | 7/1945 | Stewart | 526/221 |
| 3,086,950 | 4/1963 | Renner | 526/221 |
| 3,668,194 | 6/1972 | Shen | 526/221 |
| 3,701,762 | 10/1972 | Holler | 526/221 |
| 3,940,434 | 2/1976 | Haas et al. | 562/457 |
| 4,238,619 | 12/1980 | Crivello et al. | 568/14 |
| 4,308,118 | 12/1981 | Dudgeon | 523/428 |
| 4,540,763 | 9/1985 | Kirchhoff | 526/281 |
| 4,622,375 | 11/1986 | Wong | 526/284 |
| 4,638,078 | 1/1987 | Kirchhoff | 558/414 |
| 4,642,329 | 2/1987 | Kirchhoff et al. | 526/284 |
| 4,661,193 | 4/1987 | Kirchhoff et al. | 156/307.3 |
| 4,667,004 | 5/1987 | Wong | 526/284 |
| 4,667,005 | 5/1987 | Wong | 526/284 |
| 4,687,823 | 8/1987 | Kirchhoff et al. | 526/284 |
| 4,724,260 | 2/1988 | Kirchhoff et al. | 526/258 |

FOREIGN PATENT DOCUMENTS 50-46797  4/1975  Japan ................................ 526/221

Primary Examiner—Joseph L. Schofer
Assistant Examiner—N. Sarofim

[57] ABSTRACT

A catalytic amount of a finely divided copper salt catalyst is added to a monomer having at least one cyclobutarene group to lower the peak temperature of the polymerization oxotherm.

23 Claims, No Drawings

COPPER SALTS AS CATALYSTS FOR MONOMERS HAVING AT LEAST ONE CYCLOBUTARENE GROUP

BACKGROUND OF THE INVENTION

This invention relates to an improved process for polymerizing a monomer having at least one cyclobutarene group. It also relates to the monomer composition required for the improved process.

Polymers derived from monomers having at least one cyclobutarene group are disclosed in U.S. Pat. No. 4,540,763 and copending U.S. application Ser. No. 872,372. The polymers exhibit excellent thermal stability at high temperatures, good chemical resistance to most industrial solvents, a low dielectric constant, and low sensitivity to water. These properties are highly desirable for electronics and aerospace applications, as well as any other application where high performance is required.

The cyclobutarene monomers are typically polymerized by heating them to temperatures sufficient for polymerization. Unfortunately, most of the monomers exhibit a polymerization exotherm peak at a temperature above 250° C. Fabrication processes that employ temperature sensitive components may require polymerization temperatures below this temperature. Therefore, it would be desirable to polymerize cyclobutarene monomers at temperatures below 250° C. It would also be desirable to employ a cyclobutarene monomer composition that could be polymerized at temperatures below 250° C. without adversely altering the properties of the resulting polymer.

SUMMARY OF THE INVENTION

The invention is an improved process for polymerizing a monomer having at least one cyclobutarene group by subjecting the monomer to thermal or electromagnetic radiation at conditions sufficient to open the cyclobutane ring of the cyclobutarene group. The improvement comprises conducting the polymerization in the presence of a catalytic amount of a finely divided copper salt.

The invention is also a monomer composition comprising a homogeneous mixture of a monomer having at least one cyclobutarene group and a catalytic amount of a finely divided copper salt.

The copper salt catalyst lowers the peak temperature of the polymerization exotherm below 250° C. without adversely altering the physical properties of the resulting polymer. The invention is useful for fabrication processes requiring polymerization temperatures below 250° C.

DETAILED DESCRIPTION OF THE INVENTION

For purposes of describing this invention, a cyclobutarene is a substituted or unsubstituted aromatic compound to which is fused one or more cyclobutane rings or one or more substituted cyclobutane rings. The aromatic ring of the cyclobutarene can be substituted with lower alkyl, methoxy, methoxycarbonyl, nitro, cyano, halo, or any other group that will not adversely affect the performance of the polymers derived from the cyclobutarene monomers. Likewise, the cyclobutane ring can be substituted with similar groups. Preferably, the cyclobutarene is derived from a substituted or unsubstituted benzene. The most preferred cyclobutarene is benzocyclobutene.

Highly suitable monomers having at least one cyclobutarene group are described in U.S. Pat. No. 4,540,763 (Kirchhoff) and copending U.S. application Ser. No. 835,013, filed Feb. 28, 1986, now U.S. Pat. No. 4,724,260. A preferred monomer with one cyclobutarene group has the following formula:

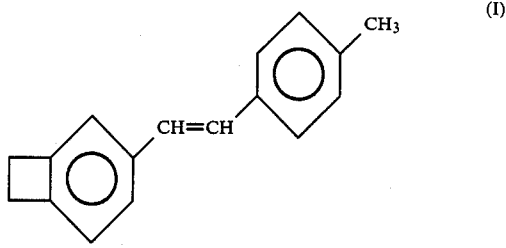

(I)

A preferred monomer with two cyclobutarene groups (a biscyclobutarene monomer) has the following formula:

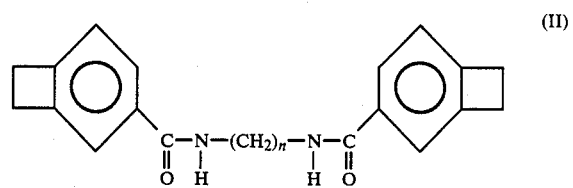

(II)

wherein n is an integer from 2 to 12, inclusive. Preferably, n is an integer of 6 or 7. Another preferred biscyclobutarene monomer has the following formula:

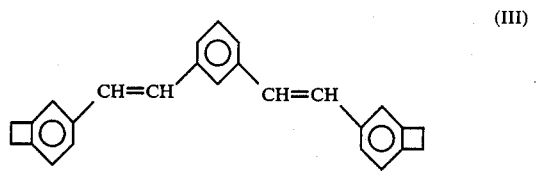

(III)

Mixtures of cyclobutarene monomers can also be employed.

Kirchhoff's patent discloses that the cyclobutarene monomers can be polymerized by heating the monomers to temperatures sufficient for polymerization. Polymerization occurs when the cyclobutane ring of the cyclobutarene group opens, forming a reactive conjugated diene. The cyclobutarene monomers can also be polymerized by exposing the monomers to electromagnetic radiation, such as gamma and electron beam radiation, as disclosed in copending U.S. application Ser. No. 835,013. Preferably, the cyclobutarene monomers are polymerized by heating them, since thermal radiation can be applied by conventional means.

The copper salt catalysts of this invention include but are not limited to copper (II) salts such as copper (II) chloride dihydrate, copper (II) pentanedionate monohydrate, copper (II) chloride, copper (II) bromide, copper (II) cinnamate, copper (II) sulfate, copper (II) gluconate, and copper (II) benzoate. Another copper salt that can be employed with the cyclobutarene monomers is the copper (II) salt of benzocyclobutene-4-carboxylic acid, which can be prepared by dissolving the acid in aqueous caustic and then adding saturated aqueous copper (II) sulfate to precipitate the desired salt. The preferred catalysts are the copper (II) salt of benzocyclobutene-4-carboxylic acid, copper (II) cinnamate, copper (II) chloride dihydrate and copper (II) pentanedionate monohydrate. Preferably, the copper salt is in the form of a fine particulate powder or flake to facilitate mixing with the cyclobutarene monomer.

The amount of copper salt catalyst required to reduce the peak temperature of the polymerization exotherm below 250° C. can vary but usually requires at least about 0.5 mole percent based on the monomer weight. The preferred amount ranges from about 1 mole percent to about 2 mole percent based on the monomer weight.

The cyclobutarene monomer and the required amount of copper salt catalyst are sufficiently mixed to achieve a homogeneous mixture. Mixing can be accomplished by physically blending the components. More preferably, mixing is accomplished by dissolving each component in a suitable solvent, combining the component solutions, and then removing the solvent from the mixture by evaporation under reduced pressure.

The following examples illustrate but do not limit the scope of this invention.

EXAMPLE 1

0.250 Grams (0.6 mmol) of the monomer of formula II, wherein n is 7, is mixed with 2 mg (0.01 mmol, 2 mole percent of the monomer weight) of copper (II) chloride dihydrate. The mixture is blended and then ground by hand in a mortar and pestle. A sample of the mixture is placed in a hermetically sealed sample pan and is analyzed in a DuPont 1090 Differential Scanning Calorimeter (DSC) at a heating rate of 10° C. per minute. The sample exhibits a peak temperature for the polymerization exotherm at 231° C., which is 25° C. lower than the peak temperature observed for the pure monomer.

EXAMPLE 2

The same monomer and catalyst and the same amounts of monomer and catalyst as that of Example 1 are dissolved separately in methanol and then combined. The mixture is stirred and the methanol is then removed under vacuum on a rotary evaporator. The resulting solid is ground in a mortar and pestle and is dried under vacuum. A sample of the dried solid is analyzed by DSC according to the procedure of Example 1 and is observed to exhibit a peak temperature for the polymerization exotherm at 231° C.

Another sample of the monomer and catalyst mixture is polymerized in a rod mold at 230° C. for three hours. The resulting polyamide rod is brown in color and contains no visible defects. The sample rod is analyzed by Thermal Gravimetric Analysis (TGA) and exhibits thermal stability at temperatures above 300° C. in a nitrogen atmosphere. The sample rod is also analyzed by Dynamic Mechanical Spectrometry (DMS) and does not exhibit a loss in tensile modulus below 250° C. in air. This data indicates that the addition of the copper salt catalyst does not adversely affect the physical properties of the resulting polymer relative to the physical properties of polymers prepared without the addition of copper salt catalysts.

EXAMPLE 3

0.381 Grams (1.73 mmol) of the monomer of formula I is mixed with 20 mg (0.028 mmol, 1.6 mole percent of the monomer weight) of the copper (II) salt of benzocyclobutene-4-carboxylic acid in a miniature agate crucible. The mixture is heated to about 50° C. to melt the monomer, and then allowed to cool. As the mixture cools and solidifies, it is ground by hand with an agate pestle. A sample of the mixture is placed in a sealed sample pan and is analyzed by DSC using a Mettler TA3000 Thermal Analyzer. The sample is run over a temperature range from 50° C. to 350° C. at a heating rate of 10° C. per minute. The sample exhibits a peak temperature for the polymerization exotherm at 229° C., which is 27° C. lower than the peak temperature observed for the pure monomer.

EXAMPLE 4

0.381 Grams (1.73 mmol) of the monomer of formula I is blended with 21 mg (0.030, 1.7 mole percent of the monomer weight) of copper (II) trans-cinnamate and analyzed by DSC following the procedure of Example 3. The peak temperature for the polymerization exotherm is 229° C.

Upon substantially repeating the procedures described in these examples with other monomers having at least one cyclobutarene group and other copper salt catalysts, similar excellent results are obtained.

What is claimed is:

1. An improved process for polymerizing a monomer having at least one cyclobutarene group by subjecting the monomer to thermal or electromagnetic radiation at conditions sufficient to open the cyclobutane ring of the cyclobutarene group; wherein the improvement comprises conducting the polymerization in the presence of a catalytic amount of a finely divided copper salt.

2. The process of claim 1 wherein the copper salt is a copper (II) salt.

3. The process of claim 2 wherein the cyclobutarene group is a benzocyclobutene group.

4. The process of claim 3 wherein the monomer has the formula:

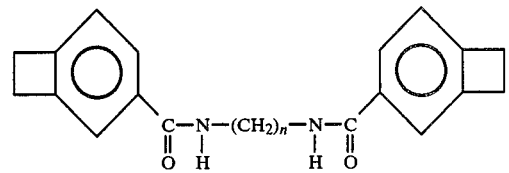

wherein n is an integer from 2 to 12, inclusive.

5. The process of claim 4 wherein n is 6 or 7.

6. The process of claim 3 wherein the monomer has the formula:

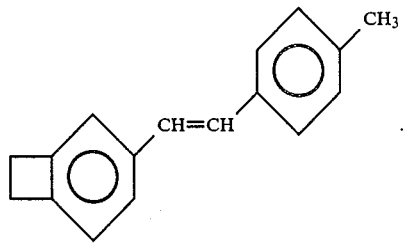

7. The process of claim 3 wherein the monomer has the formula:

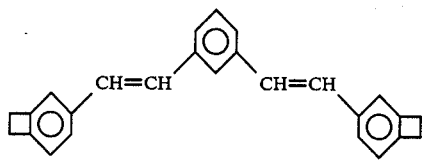

8. The process of claim 1 wherein the monomer is polymerized by subjecting it to thermal radiation.

9. The process of claim 2 wherein the copper (II) salt is selected from the group consisting of copper (II) chloride dihydrate, copper (II) pentanedionate monohydrate, copper (II) chloride, copper (II) bromide, copper (II) cinnamate, copper (II) sulfate, copper (II) gluconate, the copper (II) salt of benzocyclobutene-4-carboxylic acid, and copper (II) benzoate.

10. The process of claim 9 wherein the copper (II) salt is selected from the group consisting of copper (II) chloride dihydrate, copper (II) pentanedionate monohydrate, the copper (II) salt of benzocyclobutene-4-carboxylic acid, and copper (II) cinnamate.

11. The process of claim 1 wherein the amount of copper salt employed is at least about 0.5 mole percent based on the monomer weight.

12. The process of claim 11 wherein the amount of copper salt employed ranges from about 1 mole percent to about 2 mole percent based on the monomer weight.

13. A monomer composition comprising a homogeneous mixture of a monomer having at least one cyclobutarene group and a catalytic amount of a finely divided copper salt.

14. The monomer composition of claim 13 wherein the copper salt is a copper (II) salt.

15. The monomer composition of claim 14 wherein the cyclobutarene group is a benzocyclobutene group.

16. The composition of claim 15 wherein the monomer has the formula:

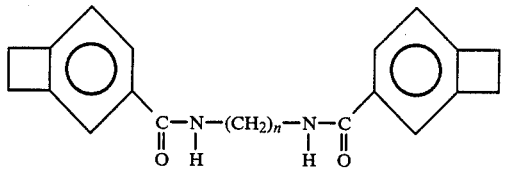

wherein n is an integer from 2 to 12, inclusive.

17. The composition of claim 16 wherein n is 6 or 7.

18. The composition of claim 16 wherein the monomer has the formula:

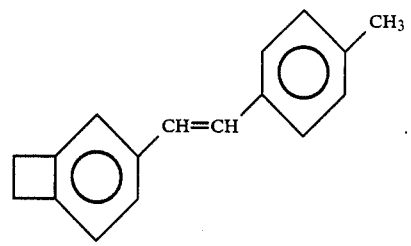

19. The composition of claim 16 wherein the monomer has the formula:

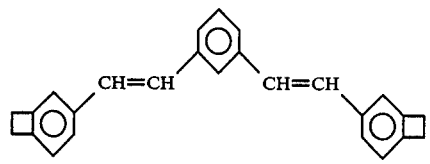

20. The composition of claim 14 wherein the copper (II) salt is selected from the group consisting of copper (II) chloride dihydrate, copper (II) pentanedionate monohydrate, copper (II) chloride, copper (II) bromide, copper (II) cinnamate, copper (II) sulfate, copper (II) gluconate, the copper (II) salt of benzocyclobutene-4-carboxylic acid, and copper (II) benzoate.

21. The composition of claim 20 wherein the copper (II) salt is selected from the group consisting of copper II chloride dihydrate, copper II chloride pentanedionate monohydrate, the copper (II) salt of benzocyclobutene-4-carboxylic acid, and copper (II) cinnamate.

22. The composition of claim 13 wherein the amount of copper salt in the monomer composition is at least about 0.5 mole percent based on the monomer weight.

23. The composition of claim 22 wherein the amount of copper salt in the monomer composition ranges from about 1 mole percent to about 2 mole percent based on the monomer weight.

* * * * *